United States Patent
Honda et al.

(10) Patent No.: US 11,972,552 B2
(45) Date of Patent: Apr. 30, 2024

(54) ABNORMAL WAFER IMAGE CLASSIFICATION

(71) Applicant: PDF Solutions, Inc., Santa Clara, CA (US)

(72) Inventors: Tomonori Honda, Santa Clara, CA (US); Richard Burch, McKinney, TX (US); Qing Zhu, Rowlett, TX (US); Jeffrey Drue David, San Jose, CA (US)

(73) Assignee: PDF Solutions, Inc., Santa Clara, CA (US)

( * ) Notice: Subject to any disclaimer, the term of this patent is extended or adjusted under 35 U.S.C. 154(b) by 499 days.

(21) Appl. No.: 17/237,516

(22) Filed: Apr. 22, 2021

(65) Prior Publication Data

US 2021/0334608 A1 Oct. 28, 2021

Related U.S. Application Data

(60) Provisional application No. 63/013,737, filed on Apr. 22, 2020.

(51) Int. Cl.
| | |
|---|---|
| *G06K 9/62* | (2022.01) |
| *G06F 18/2415* | (2023.01) |
| *G06F 18/2431* | (2023.01) |
| *G06N 5/04* | (2023.01) |
| *G06N 20/00* | (2019.01) |
| *G06T 7/00* | (2017.01) |
| *G06V 10/44* | (2022.01) |
| *G06V 10/764* | (2022.01) |
| *G06V 10/82* | (2022.01) |

(52) U.S. Cl.
CPC ........ *G06T 7/0004* (2013.01); *G06F 18/2415* (2023.01); *G06F 18/2431* (2023.01); *G06N 5/04* (2013.01); *G06N 20/00* (2019.01); *G06V 10/454* (2022.01); *G06V 10/764* (2022.01); *G06V 10/82* (2022.01); *G06T 2207/20076* (2013.01); *G06T 2207/30148* (2013.01)

(58) Field of Classification Search
CPC ......... G06T 7/0004; G06T 2207/20076; G06T 2207/30148; G06T 2207/20084; G06F 18/2415; G06F 18/2431; G06N 5/04; G06N 20/00; G06N 3/045; G06N 20/10; G06N 20/20; G06V 10/454; G06V 10/764; G06V 10/82
See application file for complete search history.

(56) References Cited

U.S. PATENT DOCUMENTS

| | | | |
|---|---|---|---|
| 6,456,899 B1 | 9/2002 | Gleason | |
| 8,965,116 B2 | 2/2015 | Ribnick et al. | |

(Continued)

OTHER PUBLICATIONS

International Search Report and Written Opinion of the ISA dated Jul. 21, 2021.

*Primary Examiner* — Duy M Dang
(74) *Attorney, Agent, or Firm* — Dergosits & Noah LLP

(57) ABSTRACT

A semiconductor image classifier. Convolution functions are applied to modify the wafer images in order to extract key information about the image. The modified images are condensed then processed through a series of pairwise classifiers, each classifier configured to determine that the image is more like one of the pair than the other. Probabilities from each classifier are collected to form a prediction for each image.

20 Claims, 12 Drawing Sheets

(56) References Cited

U.S. PATENT DOCUMENTS

2013/0202200 A1\* 8/2013 Ribnick .............. G06F 18/2321
382/160
2013/0294680 A1 11/2013 Harada et al.
2016/0163035 A1 6/2016 Chang et al.

\* cited by examiner

| | | | | | | |
|---|---|---|---|---|---|---|
| 0.00000067 | 0.00002292 | 0.00019117 | 0.00038771 | 0.00019117 | 0.00002292 | 0.00000067 |
| 0.00002292 | 0.00078633 | 0.00655965 | 0.01330373 | 0.00655965 | 0.00078633 | 0.00002292 |
| 0.00019117 | 0.00655965 | 0.05472157 | 0.11098164 | 0.05472157 | 0.00655965 | 0.00019117 |
| 0.00038771 | 0.01330373 | 0.11098164 | 0.22508352 | 0.11098164 | 0.01330373 | 0.00038771 |
| 0.00019117 | 0.00655965 | 0.05472157 | 0.11098164 | 0.05472157 | 0.00655965 | 0.00019117 |
| 0.00002292 | 0.00078633 | 0.00655965 | 0.01330373 | 0.00655965 | 0.00078633 | 0.00002292 |
| 0.00000067 | 0.00002292 | 0.00019117 | 0.00038771 | 0.00019117 | 0.00002292 | 0.00000067 |

*FIG. 4*

$$\begin{bmatrix} 1 & 0 & -1 \\ 0 & 0 & 0 \\ -1 & 0 & 1 \end{bmatrix}$$

*FIG. 6A*

$$\begin{bmatrix} 0 & 0 & 0 \\ 1 & -4 & 1 \\ 0 & 1 & 0 \end{bmatrix}$$

*FIG. 6B*

$$\begin{bmatrix} -1 & -1 & -1 \\ -1 & 8 & -1 \\ -1 & -1 & -1 \end{bmatrix}$$

*FIG. 6C*

$$\begin{bmatrix} 0 & -1 & 0 \\ -1 & 5 & -1 \\ 0 & -1 & 0 \end{bmatrix}$$

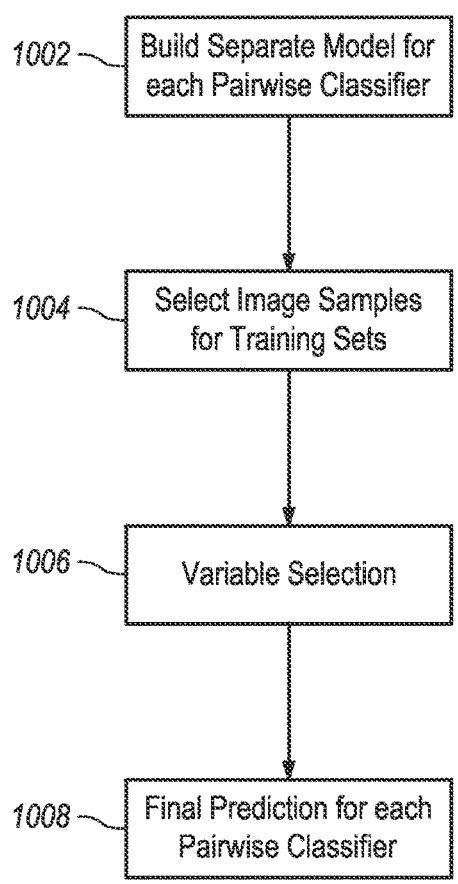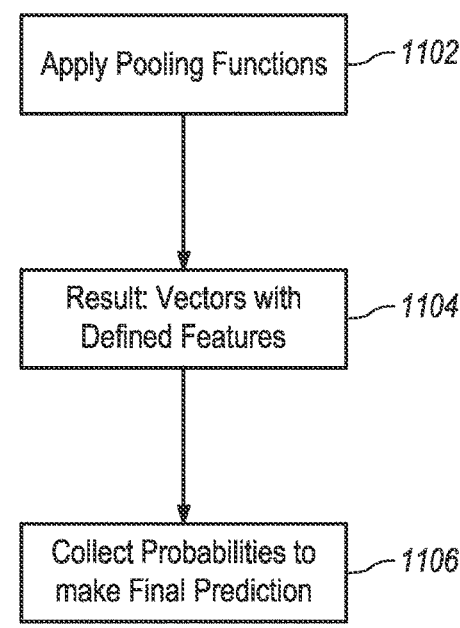
FIG. 10
FIG. 11

|  |  | Prediction | | | |
|---|---|---|---|---|---|
|  |  | A | B | C | D |
| Actual | A | 28 | 0 | 0 | 2 |
|  | B | 0 | 48 | 1 | 4 |
|  | C | 0 | 0 | 67 | 0 |
|  | D | 0 | 3 | 0 | 85 |
|  |  | accuracy | 0.957983 | | |

*FIG. 13A*

|  |  | Prediction | | | |
|---|---|---|---|---|---|
|  |  | Defect | Stripe | Blemish | Normal |
| Actual | Defect | 77 | 0 | 0 | 2 |
|  | Stripe | 1 | 40 | 0 | 1 |
|  | Blemish | 0 | 0 | 78 | 15 |
|  | Normal | 0 | 0 | 11 | 300 |
|  |  | accuracy | 0.942857 | | |

*FIG. 13B*

ABNORMAL WAFER IMAGE CLASSIFICATION

CROSS REFERENCE

This application claims priority from U.S. Provisional Application No. 63/013,737 entitled Defect Image Classifier, filed Apr. 22, 2020, and incorporated herein by reference in its entirety.

TECHNICAL FIELD

This application relates to semiconductor manufacturing processes, and more particularly, to systems and methods for classifying semiconductor wafer issues/problems using image analysis.

BACKGROUND

Image classification in general has become highly developed, for example, by web-based efforts such as Google, Facebook, etc., which by their nature have access to literally millions of pictures that can be utilized as a training set for machine-based image classification schemes. The typical semiconductor company, however, has a much smaller dataset of perhaps only a few hundred images to utilize for training sets. Thus, it would be desirable to adapt and develop techniques for machine-based analysis and classification of semiconductor wafers using these smaller datasets.

DESCRIPTION OF DRAWINGS

FIG. 4 is an example 7×7 kernel for implementing the Gaussian blur function illustrated in FIGS. 3A-3D.

FIGS. 6A-6C are example 3×3 kernels for implementing an edge detection function, with the edge detection function of FIG. 6C implementing the edge detection function illustrated in FIGS. 5A-5D.

FIG. 10 is a flow chart illustrating in more detail the pairwise classification step of FIG. 9.

FIG. 11 is a flow chart illustrating in more detail the variable selection step of FIG. 10.

FIGS. 13A and 13B are tables illustrating the accuracy of prediction results aggregated from the individual pairwise classifiers.

DETAILED DESCRIPTION

Figure 1:
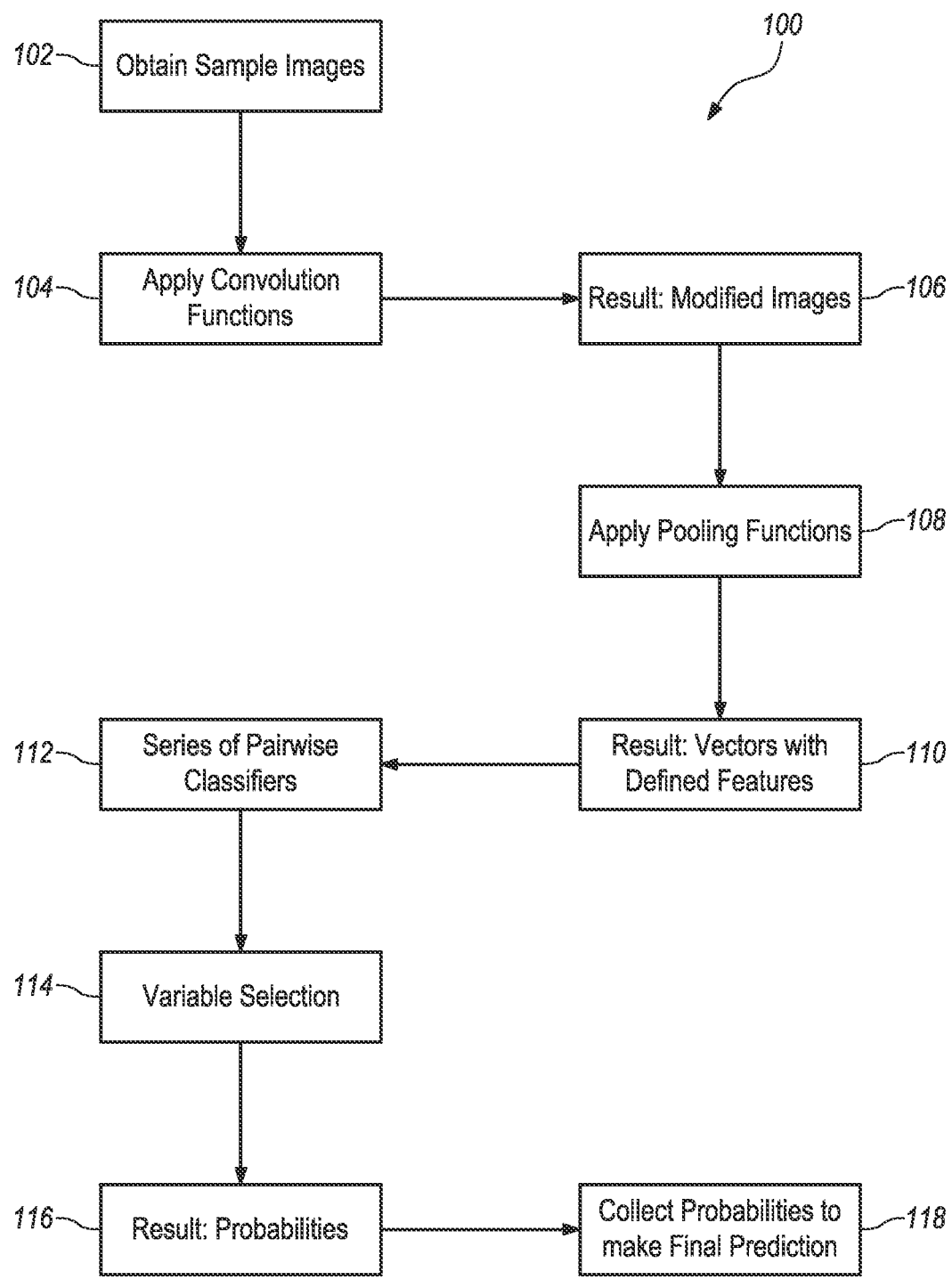
FIG. 1 is a flow chart illustrating a process for classifying wafer issues using image processing techniques.

This disclosure is directed to methods and systems for classifying images of semiconductor wafers based on the type of abnormalities. The core of a machine learning solution for a semiconductor processing application is developed through feature engineering and feature selection. Feature engineering is the process of generating features from raw data to better represent a problem for solution to predictive machine learning models. Feature selection (also called variable selection) is the process of selecting the features that contribute most significantly to understanding and predicting the particular problem for modeling and discarding those features that do not contribute significantly. However, the manner in which feature engineering and feature selection are implemented for any specific application continues to evolve, and each application is of course dependent on the client-based context including the details of the semiconductor processing environment. Feature engineering is often considered to include the feature selection step.

In one approach, features can be identified and generated by first applying one or more convolution functions to an original image of a wafer image to try and better identify a specific wafer problem through image observation and analysis. The result of each convolution is a modified image that (hopefully) shows the specific wafer problem in better detail. However, because different problems may be revealed by different convolution functions, or by a combination of convolution functions, and because each fabrication facility typically has operating and environmental differences, there may be different functions or combinations of functions that work as solution sets for the same type of problem (such as a blemish, defect, or stripe) at different locations.

After the convolution step, global pooling functions are applied to condense the modified image into a single-dimensional vector result. The vector result is easier to deal with in many respects: simpler representation; less storage and processing requirements; numerical metric can be used in logical circuits; etc. The pooling step is thus used to define features that may be of interest by applying various pooling functions to the image. In one embodiment, statistical functions may be applied at various points across the image, although other types of functions could also be employed. For example, fuzzy integrals such as the Choquet Integral have been used to condense data sets based on fuzzy math, a fast Fourier Transform has been used for frequency analysis, simple linear aggregation applied, etc.

Features are then selected using a hierarchical modeling approach to focus on variables that act to distinguish pairs of classes. For example, a separate predictive classifier model is built for each pair of defined problem classes. Further, each predictive classifier model performs its own variable selection steps in order to reduce and limit the number of variables as input to the model to significant variables for that predictive model. The result of each predictive classifier model thus indicates whether the wafer problem is more like the first problem class or the second problem class, rather than the approach of conventional classifiers, which attempt to assign a class to the vector rather than, as here, a series of pairwise comparisons.

A final classifier predictive model makes the final prediction of the problem based on the predicted probabilities as inputs from each of the separate pairwise predictive classifiers.

FIG. 1 is a flow chart illustrating a simple process 100 for classifying wafers based on image processing. In step 102, sample images are obtained. One or more convolution functions are then applied in step 104 to generate modified images in step 106. In general, a number of different convolution functions should be tried for a new or updated client application, both individually and in combination, to look for the most effective image processing techniques that will work for the images from that application.

Pooling functions are then applied in step 108 which act to reduce the two-dimensional images into one-dimensional representations having a plurality of defined features in step 110. For example, a vector representation may be produced by applying a statistical measure at various points across a dimension of the image, e.g., the features may be standard deviations taken at x=1, x=2, etc.

Each one-dimensional representation of the sample images, i.e., the vectors are processed through a series of pairwise classifiers in step 112 including iteratively running each classifier as part of a variable selection process 114 that reduces the number of features down to two to four features for each classifier model. The result in step 116 is a probability or likelihood: is the vector more like the first of the unique pair or the second of the unique pair? The probabilities from all the pairwise classifiers are collected at step 118 to make a final prediction for each pairwise comparison.

Figure 2A:
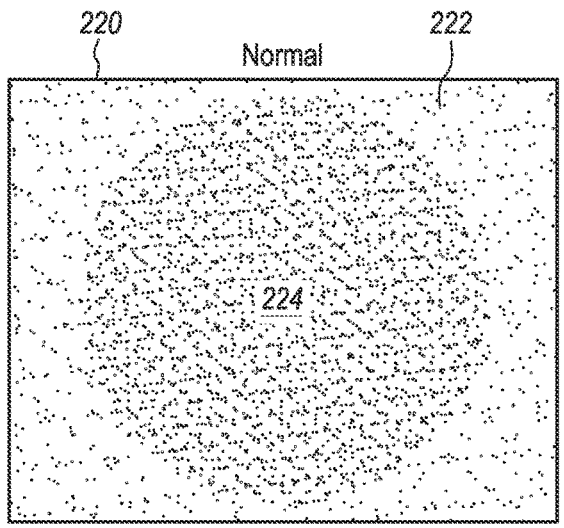
FIGS. 2A-2D illustrate four different types or classes of original wafer images, including normal, blemish, unspecified defect and stripes.
Figure 2B:
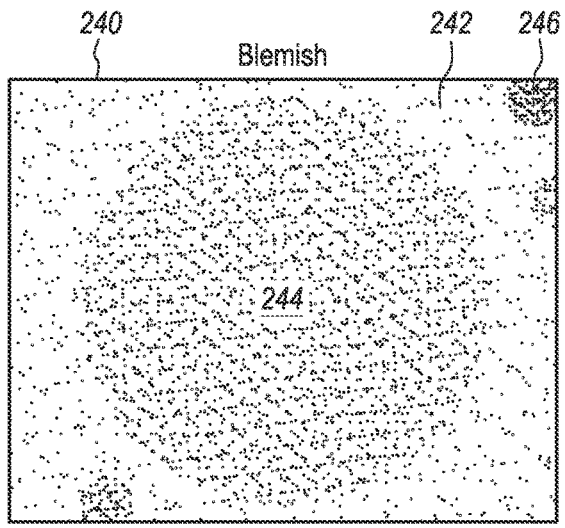
Figure 2C:
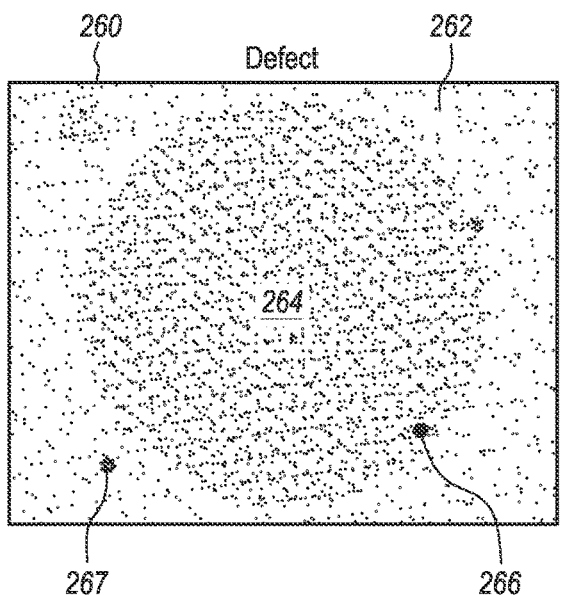
Figure 2D:
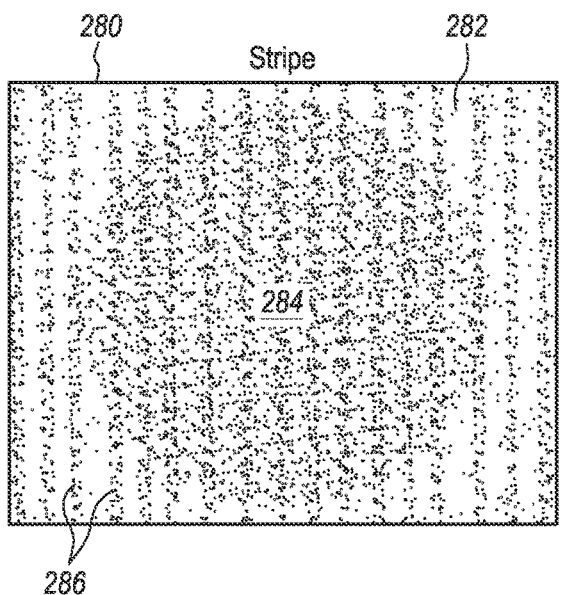

Several examples are presented to help illustrate these concepts. FIGS. 2A-2D are four different original images of wafers (on substrates) that were taken using conventional optical imaging equipment in a semiconductor process. Each image may be stored as a 200 kB JPG file or similar. FIG. 2A is an example of an image 220 of substrate 222 having a circular wafer 224 formed on the substrate that appears "normal," i.e., no apparent problems from the image. FIG. 2B is an example of an image 240 of substrate 242 having a circular wafer 244 formed on the substrate that includes a prominent dark "blemish" appearing as a large dark circle 246 in the top right corner of the image as well as several other blemishes on the substrate adjacent the wafer. FIG. 2C is an example of an image 260 of substrate 262 having a circular wafer 264 with an unspecified "defect" appearing as several small dark circles on the edge of the wafer, such as defect 246 on the lower right corner of this image. FIG. 2D is an image 280 of substrate 282 having a circular wafer 284 on the substrate with a series of vertical edges or "stripes" 286 appearing across the entirety of the substrate and wafer image. Each of these types of problems (blemish, defect, stripes) has a different root cause and requires different analysis and attention. There may of course be other problems or defects that may be the subject of the same kind of analysis described here.

Convolution

After obtaining sample wafer images ("original images"), one or more convolution functions are applied to the samples. The techniques can be applied to black and white or grayscale images as well as color images. Depending on the problem associated with a particular wafer set, a different convolution function or set of functions may be necessary or important to the particular problem of interest. In fact, some trial and error is likely required to determine the right combination of convolution and aggregation (pooling) functions work to capture a signal for a particular type of problem at a particular fab location.

For example, Gaussian blur is an image softening technique that blurs an image using a low-pass filter to smooth out uneven pixel values by removing extreme outliers. This technique appears useful for detecting circular blemishes such as shown in FIG. 2B. FIGS. 3A-3D show the result of processing each of the images 220, 240, 260 and 280 after a Gaussian blur filter has been applied, resulting in images 320, 340, 360 and 380, respectively. The convolution matrix or kernel selected to apply to the images as the Gaussian function should be related to the size of the defect or blemish, e.g., the kernel size should relate to the radius of the defect. If there is small defect, a small kernel, such as 2×2 or 3×3, will be adequate. If the defect is large, the kernel should be larger; e.g., if the defect a size 10, then apply a 10×10 kernel. The size of the defect is typically measured by an x,y pixel count (e.g., 2×2 or 3×3) rather than actual dimensional length and width of the defect. Thus, if the same defect has an image taken with different zoom ratio, the relevant kernel will be sized accordingly. There are many well-known convolution matrices that have been studied and shown to be effective for image analytics, and thus, it is possible to select a convolution function that should be effective to capture the defect of interest.

In this case, a 7×7 kernel as shown in FIG. 4 was applied to the original images. The expectation is that lighter images get filtered out while darker images remain, thus providing a basis for distinguishing different images. For example, the blemish 246 in modified image 340 (transformed from image 240 in FIG. 2B) still appears as a prominent dark circle in FIG. 3B. Likewise, the most prominent of the small defects 266 still appears in FIG. 3C. However, the small items like defects 266 could be filtered out when looking for larger items like blemish 246.

In one embodiment, the convolution function will be applied multiple times as this step may cause some features to display better. By having multiple convolutions of the Gaussian blur function, for example, the darker regions remain dark while other regions get lighter thus enabling a detectable signal difference that the predictive machine learning model can use as input for predicting/detecting this type of blemish.

Figure 3A:
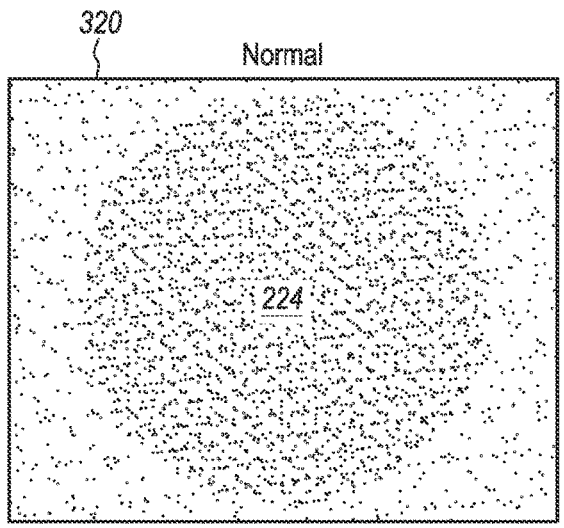
FIGS. 3A-3D are the four different wafer images of FIGS. 2A-2D, respectively, each modified by a Gaussian blur function.
Figure 3B:
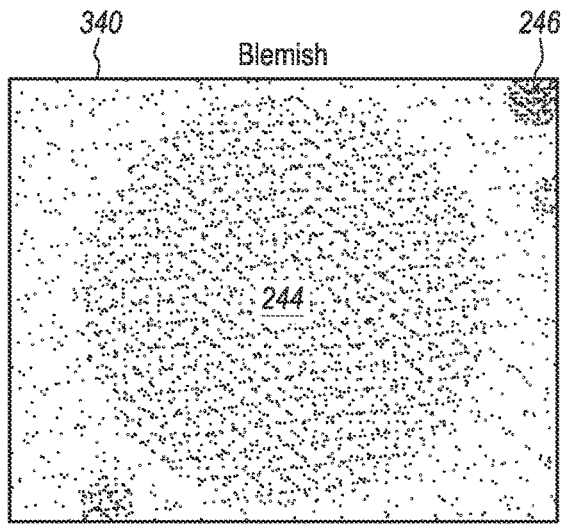
Figure 3C:
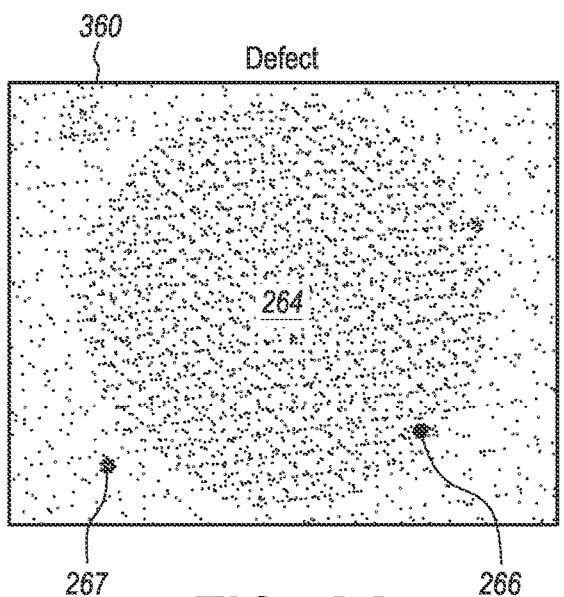
Figure 3D:
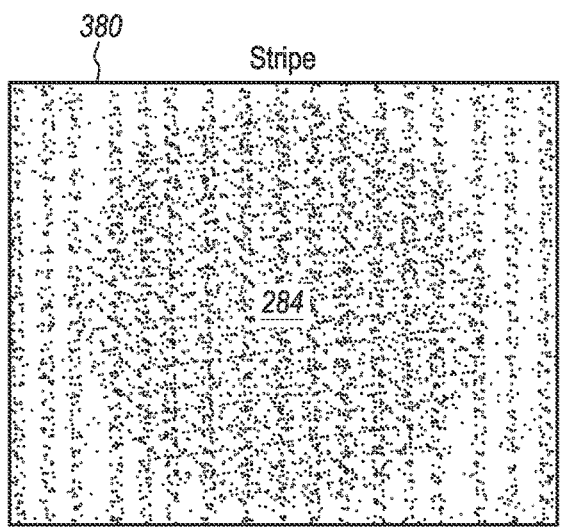
Figure 5A:
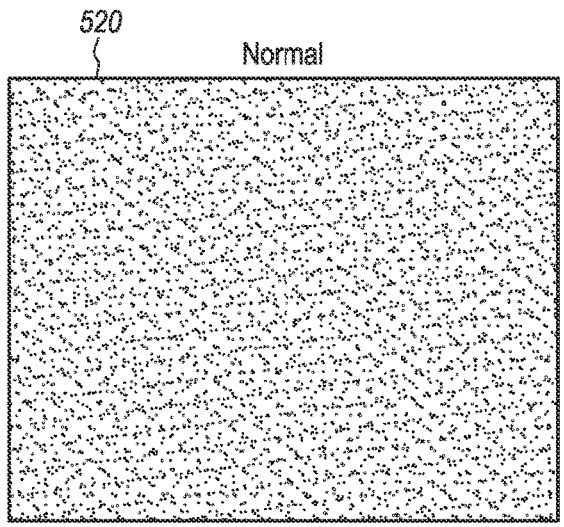
FIGS. 5A-5D are the four different wafer images of FIGS. 2A-2D, respectively, modified by an edge detection function.
Figure 5B:
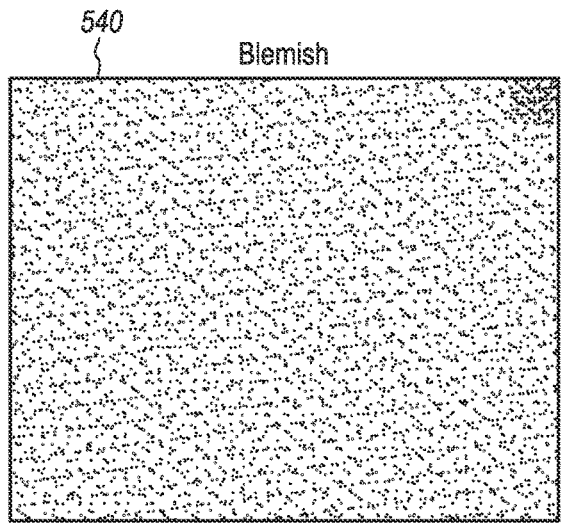
Figure 5C:
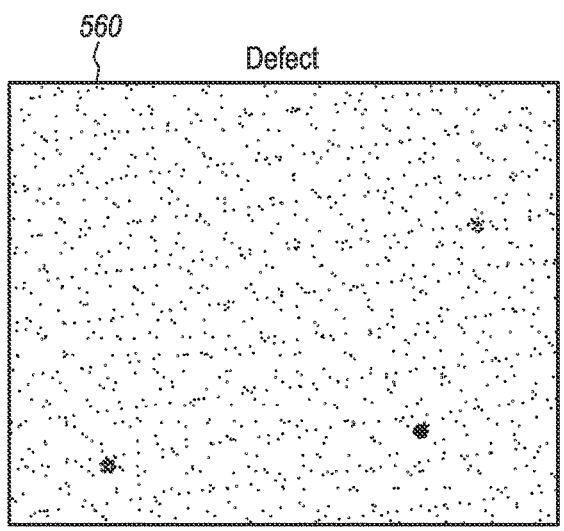
Figure 5D:
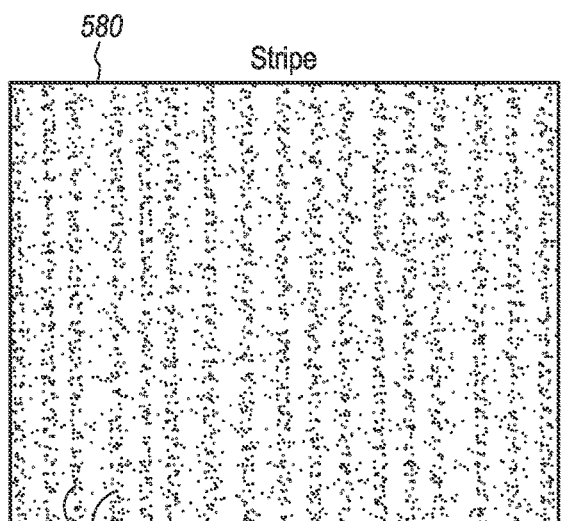

One possible difficulty arising from example of blemish in FIGS. 2B and 3B is its proximity to the edge of the image, which can create difficulty with signal detection; and in fact multiple convolutions may make this problem worse.

Referring now to FIGS. 5A-5D, the result of processing each of the original images 220, 240, 260, 280 is shown after an edge detection function has been applied to generate images 520, 540, 560 and 580, respectively. Edge detection algorithms would seem to make sense for detecting the stripe pattern 286 shown in FIG. 2D. However, when the edges are visible but not really distinct, then it may still be difficult to detect the stripe pattern, such as in the example of FIG. 5D.

In this case, various 3×3 kernels (shown in FIGS. 6A-6C) were applied to original images 220, 240, 260, 280. The kernel of FIG. 6C seemed to work best in this particular example, resulting in the images of FIGS. 5A-5D; but other variations of kernel values may produce good results depending on the number and quality of the images that are sampled and the problem to be detected. Also, different results can be obtained by selecting a kernel to be applied in a single direction (x or y) or in multiple directions (x and y).

Figure 7A:
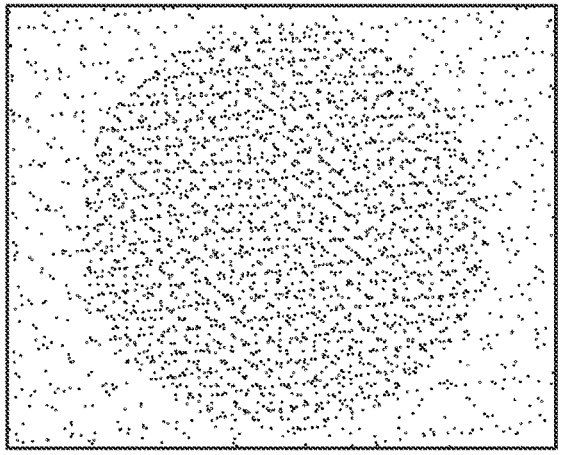
FIGS. 7A-7D are the four different wafer images of FIGS. 2A-2D, respectively, modified by a sharpen function.
Figure 7B:
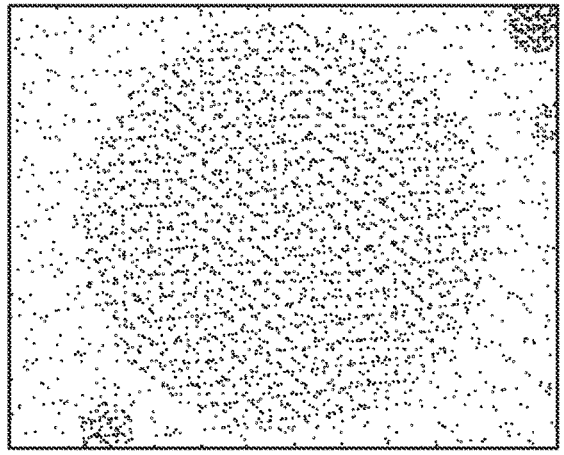
Figure 7C:
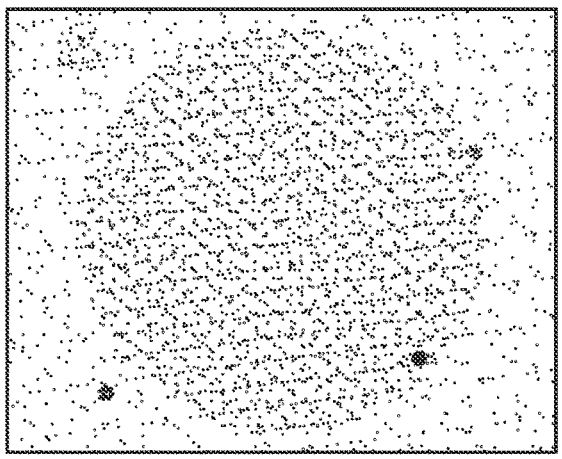
Figure 7D:
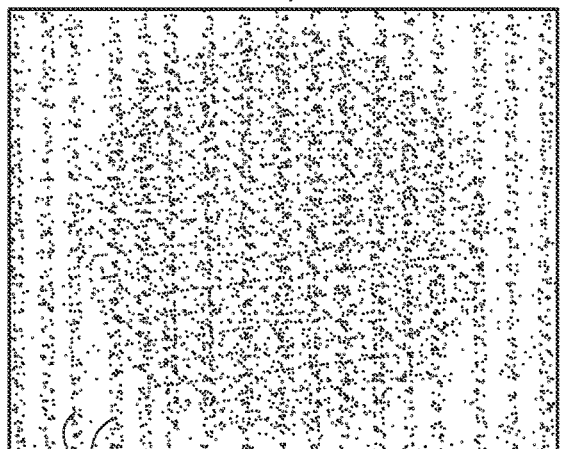

In FIGS. 7A-7D, a sharpen function has been applied to the original images, and it turns out that the stripes 286 are quite a bit more distinct after the sharpen function, as shown in FIG. 7D.

Many other functions from the image processing and computer vision fields could be applied to images to observe their impact on detection of a key signal for various different types of defects in semiconductor, including functions such as Canny edge detection, Scharr filter, Prewit filter, Sobel filter and others. In particular, the Scharr filter has proven useful in predicting a normal image when it results in a lower maximum gradient value, i.e., a measure of the pixel difference relative to neighboring pixels.

Further, other types of techniques could be employed to obtain useful results for training models. Rather than a convolution function wherein the image is converted to another image, metrics could be computed based on image analysis to convert the image to a single number as a metric representing the image. For example, Shannon's Entropy is a technique for quantifying the image distribution and can be useful for locating purely random defects. See, e.g., Pal, Nikhil R., and Sankar K. Pal, *Entropy: A new definition and its applications*, IEEE Transactions on Systems, Man and Cybernetics, Vol. 21, No. 5, pp. 1260-1270 (1991). Other metric techniques include Hu's set of moments, which can be useful to show a strong moment body if the defect is symmetrical in the image. See, e.g., Huang, Zhihu, and Jinsong Leng, *Analysis of Hu's Moment Invariants on Image Scaling and Rotation,* 2010 2nd International Conference on Computer Engineering and Technology, Vol. 7, pp. V7-476 (2010). Another technique is orthonormal rectangular polynomials decomposition. See, e.g., Ye, et al., *Comparative Assessment of Orthogonal Polynomials for Wavefront Reconstruction over the Square Aperture*, JOSA A 31, No. 10, pp. 2304-11 (2014).

In another example, a lower dimensional representation of the image could be used as a metric input to the model, such as Discrete Cosine Transformation, Singular Value Decomposition, etc., including the metric representing compression errors from the image processing.

Metrics can be provided as inputs directly to machine learning models but still require feature selection. Convolution results must be condensed into a one-dimensional representation, such as a vector, in order to be input to machine learning models and undergo feature selection.

Any of the convolutional techniques and metric techniques can be used either individually or in combination as necessary to be effective for a particular customer application in order to make a decision for distinguishing between different classes or categories of images.

Pooling

As noted above, a pooling function is applied after convolution to reduce the two-dimensional modified images into single-dimensional representations, or vectors. This may be done by taking a statistical measure at various points in each direction, e.g., at x=1, x=2, etc., and y=1, y=2, etc., of the modified image, including but not limited to mean, median, maximum, minimum, standard deviation, percentile, etc. One example of a vector for a modified image is a collection of standard deviation values in the x-direction while another vector may for the same modified image is a collection of standard deviation values in the y-direction. Each of the individual statistical values of the vector is thus an "engineered" feature or variable that may be selected if determined to be significant, as discussed below.

Rather than a conventional multi-class classifier that tries to determine what specific type or class the vector represents, the present technique uses a classifier for each pair of image types to determine whether the vector is more like the first image type or the second image type. The result is taken as a single number that represents the likelihood that the subject image is one type or the other. Then all the probability results from all the pairwise classifiers are fed into a final model to make a final predictive determination.

Modeling

Figures 8, 9:
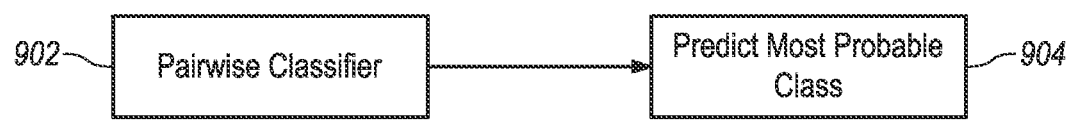
FIG. 8 is an example 3×3 kernel for implementing the sharpen function illustrated in FIGS. 7A-7D.
FIG. 9 is a flow chart illustrating a hierarchical modeling process useful for feature selection and pairwise classification.

Hierarchical modeling allows feature selection to focus on variables that contribute significantly to distinguish and separate each pair of classes. On other hand, hierarchical modeling is much more computationally intensive given that the number of pairwise classifiers needed increases proportionally to the square of the number of image categories. FIG. 9 illustrates one embodiment of a process 900 for hierarchical modeling consisting simply of step 902 for pairwise classification of wafer images and step 904 for predicting the most probable class for each pairwise image comparison.

FIG. 10 illustrates the pairwise classification step 902 in more detail. In step 1002, a separate predictive model is built for each pair of classes. In the examples above, there are four different classes (normal, blemish, defect, stripe) and therefore six different pairwise classifiers: normal vs. blemish; normal vs. defect; normal vs. stripe; blemish vs. defect; blemish vs. stripe; and defect vs. stripe. Thus, in this example, six probability scores are computed from the pairwise classifier. In step 1004, for each pairwise classifier model, image samples are selected from limited subsets of images, e.g., only two subsets are selected for training sets. Note that a defect image should not be used for training a classifier to distinguish normal vs. blemish. Variable (feature) selection is performed in step 1006, and a final prediction for each pairwise classifier in performed in step 1008.

One example of a variable selection step 1006 is illustrated in more detail in FIG. 11. First, in step 1102, the features generated in the convolution and pooling steps (or the metrics) for each image are ranked ordered, for example, using a Random Forest algorithm to determine variable importance. This variable importance is obtained by building each model using k-fold cross-validation (e.g., 20-fold) and taking the sum of variable importance.

Forward variable selection is performed in step 1104. Based on the rank ordering from step 1102, a 20-fold cross validation can be used to run each model adding one feature at time, keeping the feature if it improves the accuracy of the model. Other metrics like an F1 score or average AUC (area under curve) might also be used.

Backward variable selection is performed in step 1106 for pruning back the generated features. Each model is run again with dropping one feature at a time that was added from last to first; and returning the feature if it reduces the accuracy of the model by removing it. Typically, this variable selection step 1006 reduces the number of features down to two to four.

Other known variable selection techniques could also be employed or tried, including but not limited to a "greedy" optimization algorithm that computes variable importance and drops all variables lower than a threshold value, or a dimensional reduction method designed to remove redundant variables.

It is possible that the number of image categories may be too large for effective modeling given available computing resources. If so, then a pairwise comparison of the wafer image to groups of similar wafer image issues may be performed in the same manner as pairwise image comparison in order to determine to which group is the wafer image more similar rather than to which wafer image. Then, within the likely group, the wafer image undergoes pairwise image classification as discussed above to predict a final classification.

Figure 12A:
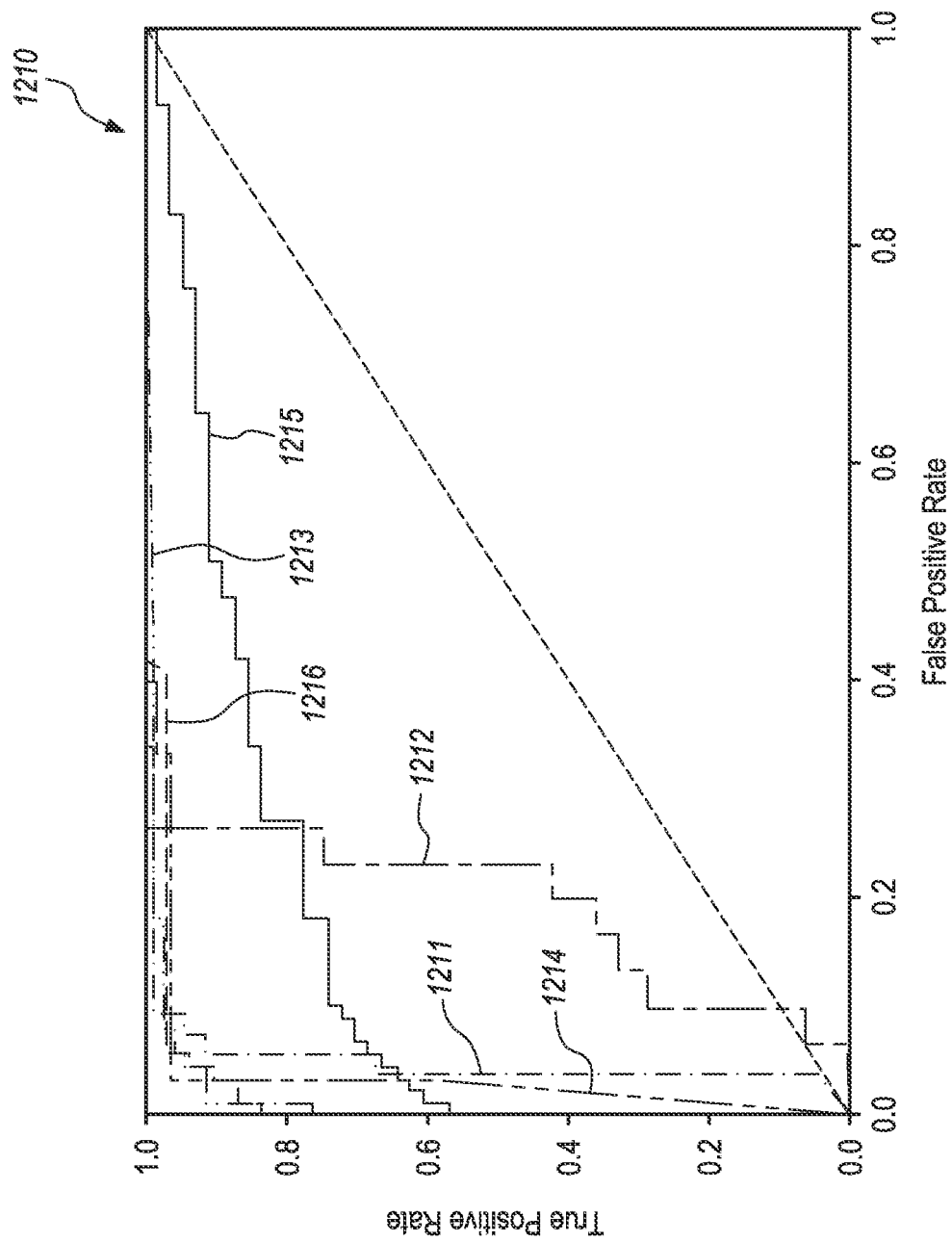
FIGS. 12A and 12B are graphical illustrations of the accuracy of example pairwise classifiers.
Figure 12B:
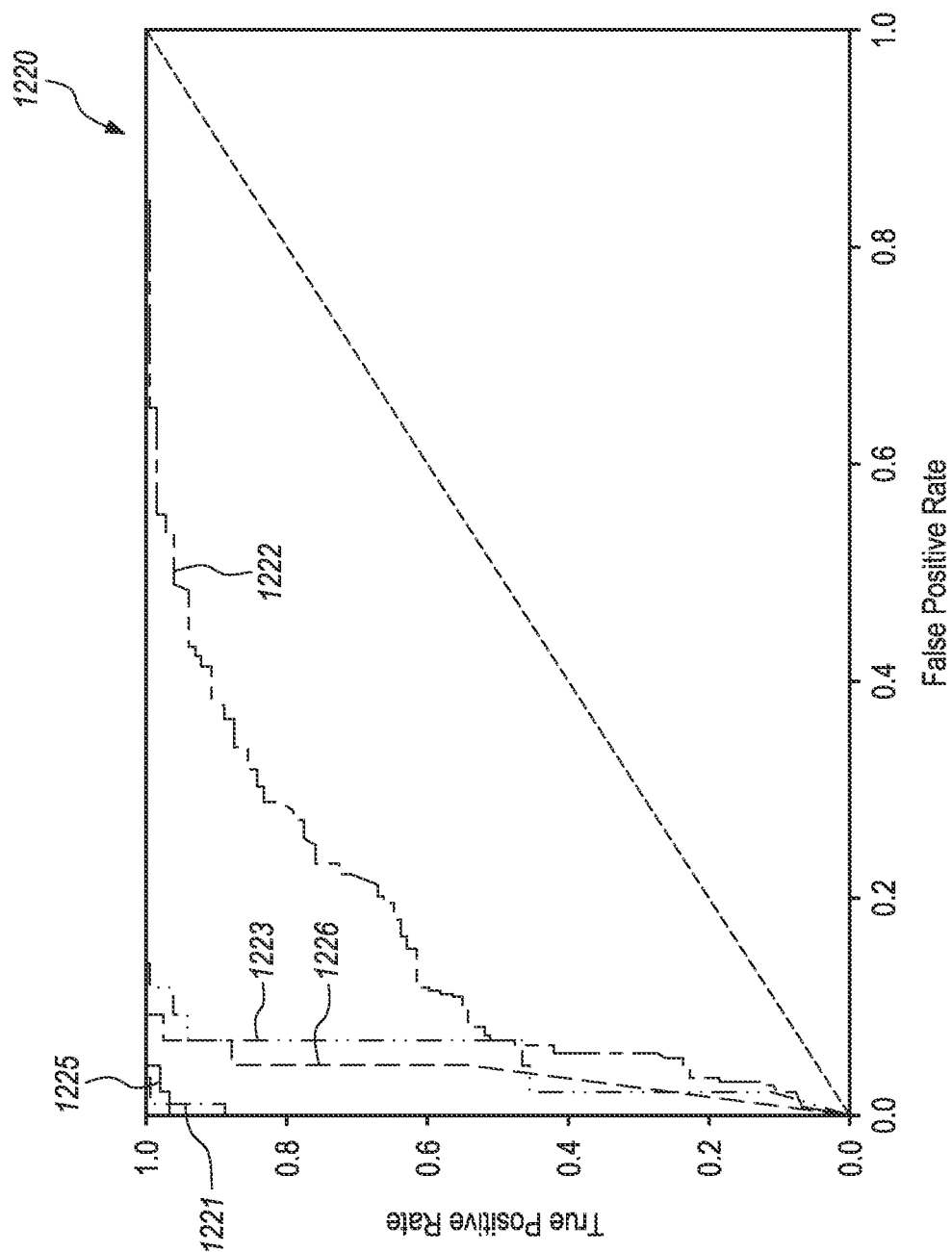

The accuracy of the pairwise classifier has been demonstrated as illustrated in FIGS. 12A-12B. The graph 1210 in FIG. 12A includes six ROC curves that are the result of the six pairwise classifiers of four different image types, A-D. Plot 1211 is the result of the A-B classifier; plot 1212 is the result of the A-C classifier; plot 1213 is the result of the A-D classifier; plot 1214 is the result of the B-C classifier; plot 1215 is the result of the B-D classifier; and plot 1216 is the result of the C-D classifier.

It can be seen from plot 1215 that the B-D pair is the most difficult to classify in this example having the smallest area under the curve and a large number of possible false positives while the plot 1211 of the A-B pair has a very large area under the curve but also spikes quickly upward indicating very few false positive and therefore is an effective and reliable classifier.

Similarly, the graph 1220 of FIG. 12B includes six ROC curves that are the result of the six pairwise classifiers of four different image types, blemish, defect, normal and stripe. Plot 1221 is the result of the blemish-defect classifier; plot 1222 is the result of the blemish-normal classifier; plot 1223 is the result of the blemish-stripes classifier; plot 1224 is the result of the defect-normal classifier; plot 1225 is the result of the defect-stripes classifier; and plot 1226 is the result of the normal-stripes classifier.

It can be seen from plot 1222 that the blemish-normal pair is the most difficult to classify in the example of FIG. 12B by the smallest area under the curve and a large number of possible false positives. The remainder of the plots in FIG. 12B indicate very few false positives, and in particular, plot 1224 of the defect-normal pair apparently indicated no false positives and was thus 100% effective in classifying between defect and normal images.

Once features have been culled to the most significant contributors for each model, the final prediction for each pairwise modeling step is determined (FIG. 10, step 1008) by running each model using only the significant contributing features as input variables to the model using 20-fold cross-validation and Random Forest techniques to reduce overfitting. In this step, a prediction is made for all wafers for all models. For example, the model for predicting a defect image uses the "normal vs. blemish" classifier to help exclude those as likely possibilities when looking for a defect.

Once the final prediction for each pairwise modeling step has been determined, a secondary model is built (FIG. 9, step 904) to predict the most probable class for each model based on the results from the pairwise classifiers. The predicted probability for each pairwise model is the input to this secondary model, and should consist of N*(N−1)/2 different probability values. The final classifier can be any classification algorithm including Logistic Regression, Support Vector Machine (SVM), Random Forest, Gradient Boosting Machine, XGBoost, Artificial Neural Network, etc. Optionally, parameter tuning can be achieved by using N-Fold stratified cross-validation.

An alternative to the hierarchical approach is direct modeling, which tries to compute the probability for each class using input parameters directly. Feature selection and parameter tuning used in an hierarchical model could be utilized to improve the direct model performance. If there is enough training data and categories, this approach makes sense. One model that has been shown to work well in this manner is the Convolutional Neural Network. However, obtaining sufficient accurate data has been difficult in the semiconductor industry thereby dictating development of the hierarchical modeling scheme.

FIGS. 13A and 13B show the results of the final image classification corresponding to the examples shown for the pairwise classification in FIGS. 12A and 12B. For both examples of the techniques described herein, the accuracy rate of the predictive model was approximately 95%. These results also show that pairwise classification is not perfect. However, many of the images may contain multiple defects as well thereby increasing the complexity of classification. More confidence in the prediction could be provided by including a confidence score.

The foregoing written description is intended to enable one of ordinary skill to make and use the techniques described herein, but those of ordinary skill will understand that the description is not limiting and will also appreciate the existence of variations, combinations, and equivalents of the specific embodiments, methods, and examples described herein.

The invention claimed is:

1. A method comprising:
   obtaining a first plurality of sample images of semiconductor wafers formed on a semiconductor substrate, the first plurality of sample images including a plurality of different image types;
   applying at least a first convolution function to each of the first plurality of images to generate a plurality of modified images each corresponding to a respective one of the plurality of sample images;
   applying a pooling function to each of the modified images to form a plurality of corresponding vectors each defining a plurality of features for each respective modified image;
   performing variable selection on each corresponding vector in order to select a smaller set of features from the plurality of features that are more important in determining image type for the vector;
   processing each corresponding vector in a plurality of machine-learning-based pairwise classifier models, each of the pairwise classifier models configured to determine a corresponding probability that the vector is more like one of unique plurality of pairs of the plurality of different image types;
   inputting the determined probabilities from the processing step into a final machine-learning-based classifier model configured to assign one of the plurality of image types to each corresponding, vector on the basis of the determined probabilities from the processing step; and
   running the final machine-learning-based classifier model.

2. The method of claim 1, the step of applying at least a first convolution function further comprising:
   identifying a kernel having a matrix of values; and
   multiplying the first plurality of images by the kernel to generate the plurality of modified images.

3. The method of claim 2, further wherein the matrix of values has a size that is proportional to feature size associated with one of the plurality of different image types.

4. The method of claim 2, further comprising:
   identifying the kernel by trying a plurality of different kernels each having a different matrix of values.

5. The method of claim 1, further comprising:
   performing the first convolution function multiple times before generating the plurality of modified images.

6. The method of claim 1, the step of applying at least a first convolution function further comprising:
   applying a plurality of different convolution functions to each of the first plurality of images to generate a plurality of sets of modified images, each set associated with one of the plurality of different convolution functions, each modified image corresponding to a respective one of the plurality of sample images; and
determining that at least one of the plurality of convolution functions s effective at showing a feature associated with at least one of the plurality of image types.

7. The method of claim 6, further comprising:
applying a combination of the plurality of different convolution functions to each of the first plurality of images to generate the plurality of sets of modified images.

8. The method of claim 1, the step of applying a pooling function further comprising:
applying a statistical measure to a plurality of points in each of the first plurality of images to generate each of the plurality of corresponding vectors.

9. The method of claim 8, further comprising:
taking a first statistical measure for a first plurality of points in a first direction across each of the first plurality of images to form a first plurality of corresponding vectors; and
taking a second statistical measure for a second plurality of points in a second direction across each of the first plurality of images to form a second plurality of corresponding vectors.

10. The method of claim 1, the step of performing variable selection further comprising:
building a plurality of predictive models each corresponding to one of the plurality of pairwise classifier models;
for each predictive model:
ordering by rank the plurality of features associated with corresponding vectors;
run the predictive model a plurality of times for forward variable selection, each time adding one of the plurality of features into the predictive model by rank order, and incorporating the added one feature into the predictive model when it improves accuracy of the predictive model; and
run the predictive model a plurality of times for backward variable selection, each time removing one of the plurality of features by reverse rank order, and reincorporating the removed one feature into the predictive model when accuracy of the predictive model was decreased by its removal.

11. A method comprising:
obtaining a first plurality of sample images of semiconductor wafers formed on a semiconductor substrate, the first plurality of sample images including a plurality of different classes of defects appearing on the sample images;
applying a plurality of mathematical operators, individually or in various combinations, to each of the first plurality of images thereby generating a plurality of modified images, each modified image corresponding to a respective one of the plurality of sample images;
condensing the plurality of modified images to a plurality of single-dimensional representations, each single-dimensional representation defining a plurality of features for each corresponding modified image;
performing variable selection on each single-dimensional representation in order to select a smaller set of features from the plurality of features that are more important in determining the class of defect for the single-dimensional representation;
processing each corresponding single-dimensional representation m a plurality of machine-learning-based pair-wise classifier models, each of the pair-wise classifier models configured to determine a corresponding probability that the single-dimensional representation is more indicative of one of a unique plurality of pairs of the plurality of different classes of defects; and
running a final machine-learning-based classifier model configured to assign one of the plurality of classes of defects to each corresponding single-dimensional representation on the basis of the determined probabilities from the processing step.

12. The method of claim 11, the step of forming variable selection further comprising:
building a plurality of predictive models each corresponding to one of the plurality of pairwise classifier models:
for each predictive model:
ordering by rank the plurality tat features associated with corresponding single-dimensional representations;
run the predictive model a plurality of times for forward variable selection, each time adding, one of the plurality of features into the predictive model by rank order, and incorporating the added one feature into the predictive model when it improves accuracy of the predictive model; and
run the predictive model a plurality of times for backward variable selection, each time removing one of the plurality of features by reverse rank order, and reincorporating the removed one feature into the predictive model when accuracy of the predictive model was decreased by its removal.

13. The method of claim 11, wherein the mathematical operators are convolution functions.

14. The method of claim 11, the condensing step further comprising:
applying pooling functions to the plurality of single-dimensional representations.

15. It method comprising:
obtaining a sample image;
iteratively processing the sample image through a plurality of pairwise classifiers, each pair of pairwise classifiers is a unique pair of a plurality of defined defect classes, each pairwise classifier is configured to determine a probability that the sample image is more like a first one of the unique pair than a second one of the unique pair; and
processing the determined probabilities from each of the plurality of pairwise classifiers to generate a final prediction for assigning one of the plurality of defined defect classes to the sample image.

16. The method of claim 15, the step of processing the sample image further comprising:
applying convolution and pooling functions to the sample image to reduce the sample image to at least one single-dimensional representation defining a plurality of features prior to the pairwise classifiers, such that the pairwise classifiers determine probabilities for the corresponding single-dimensional representation.

17. The method of claim 16, further comprising:
run each pairwise classifier a plurality of times for forward variable selection, each time adding one of the plurality of features into the pairwise classifier, and incorporating the added one feature into the pairwise classifier when it improves accuracy of the pairwise classifier; and
run each pairwise classifier a plurality of times for backward variable selection, each time removing one of the plurality of features, and reincorporating the removed one feature into the pairwise classifier when accuracy of the pairwise classifier was decreased by its removal.

18. The method of claim 17, further comprising:
running a final classifier model configured to assign one of the plurality of defined defect classes to the single-dimensional representation on the basis of results from each of the plurality of pairwise classifiers.

19. The method of claim 18 further comprising:
repeating the method steps for a plurality of sample images.

20. A method comprising
obtaining a first plurality of sample images of semiconductor wafers formed on a semiconductor substrate, the first plurality of sample images including a plurality of different image types;
computing, a plurality of single-dimension metrics each corresponding to a respective one attic plurality of sample images, each metric each defining a plurality of features for the respective sample image;
performing, variable selection on each metric in order to select a smaller set of features from the plurality of features that are more important in determining image type for the metric;
processing each corresponding metric in a plurality of machine-learning-based pairwise classifier models, each of the pairwise classifier models configured to determine a corresponding probability that the metric is more indicative of one of a unique plurality of pairs of the plurality of different image types; and
running a final machine-learning-based classifier model configured to assign one of the plurality of image types to each corresponding vector on the basis of the determined probabilities from the processing step.

* * * * *